July 7, 1931.   J. MIHALYI   1,813,673
STEREOSCOPIC TELEMETER
Filed March 12, 1928   3 Sheets-Sheet 1
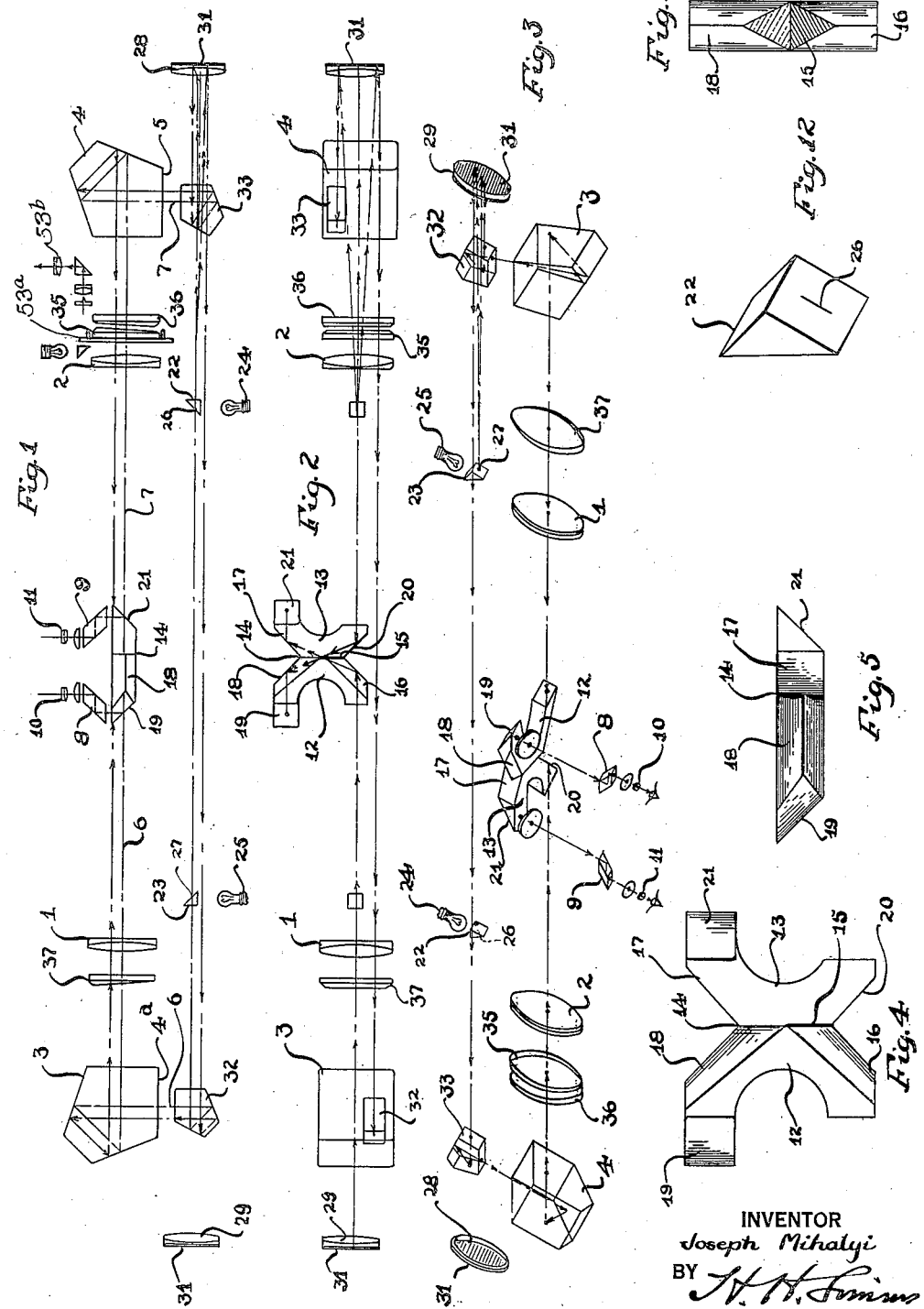
INVENTOR
Joseph Mihalyi
BY
his ATTORNEY July 7, 1931.   J. MIHALYI   1,813,673
STEREOSCOPIC TELEMETER
Filed March 12, 1928   3 Sheets-Sheet 2
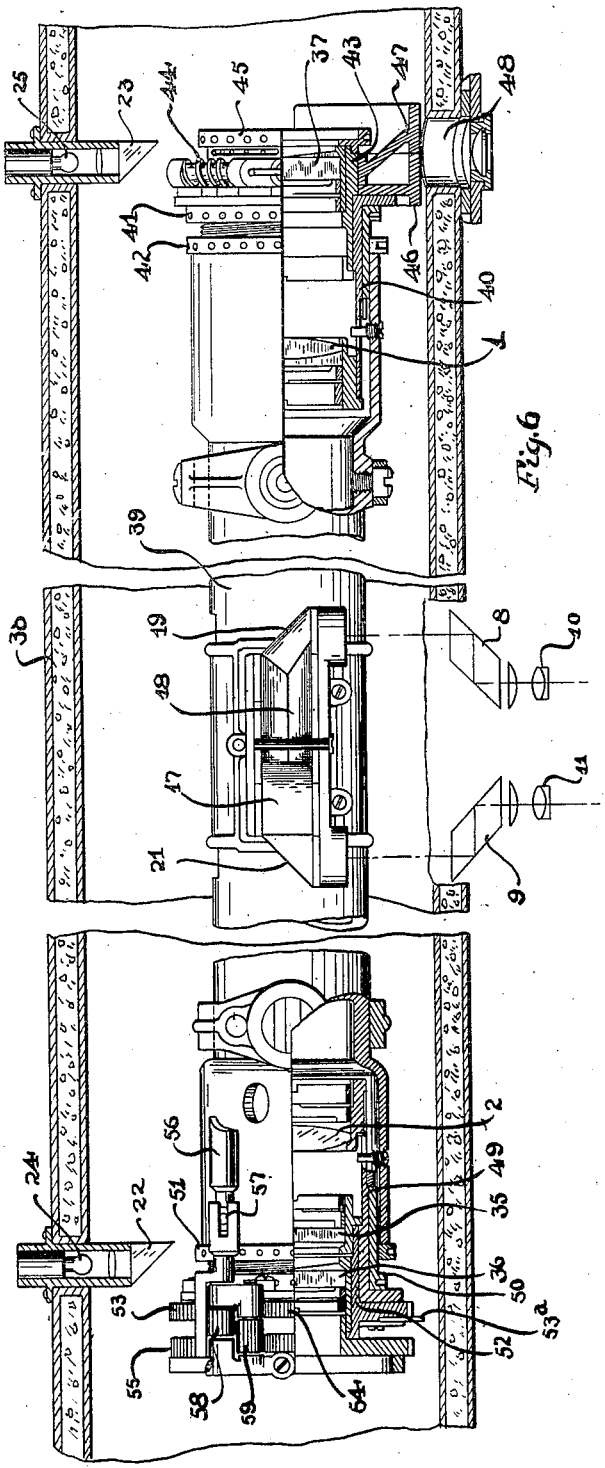
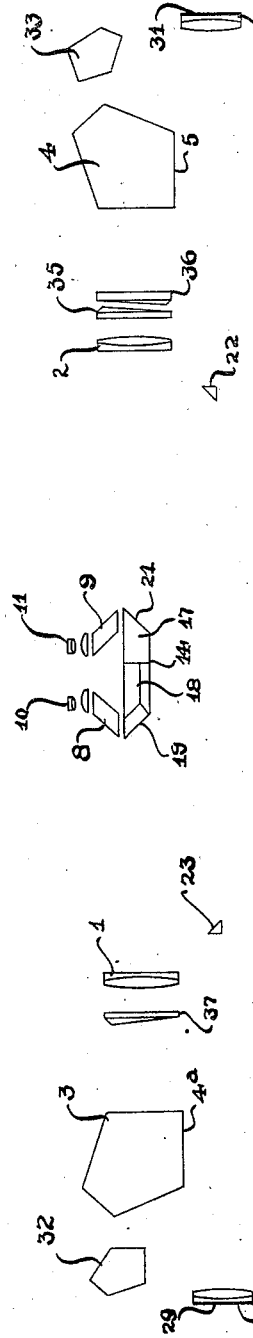
Fig. 6
Fig. 7
INVENTOR
Joseph Mihalyi
BY
his ATTORNEY

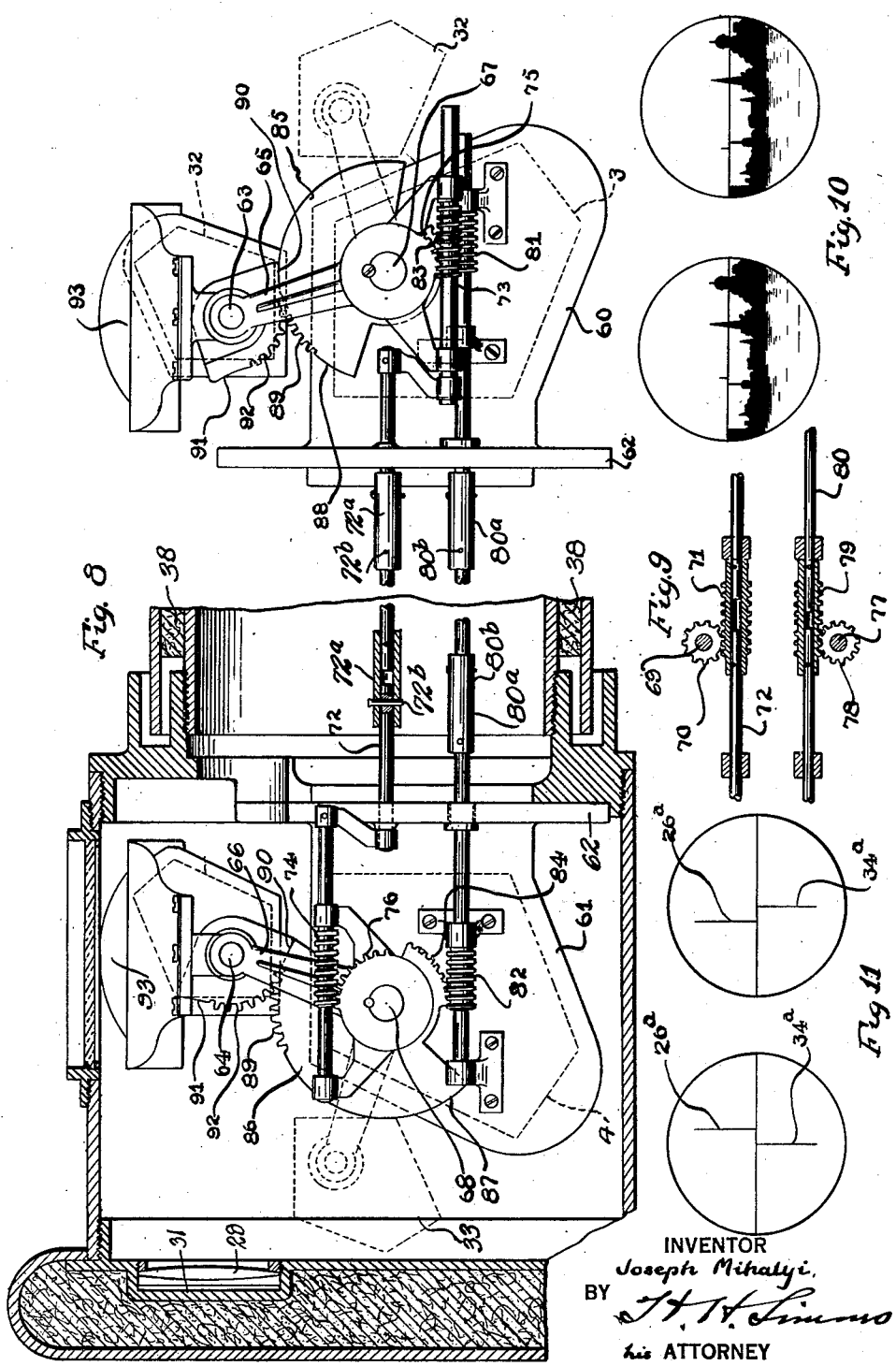

Patented July 7, 1931

1,813,673

UNITED STATES PATENT OFFICE

JOSEPH MIHALYI, OF ROCHESTER, NEW YORK

STEREOSCOPIC TELEMETER

Application filed March 12, 1928. Serial No. 260,830.

The present invention relates to stereoscopic telemeters and this application is a continuation in part of an application filed by me on August 21, 1924, Serial No. 733,435. An object of this invention is to provide a construction in which two eye pieces each receive two images from opposite ends of the instrument, provision being made in the instrument for conducting the entire bundle of rays from each end of the instrument to the two eye pieces so that the loss of portions of the two bundles of rays received by the instrument will be eliminated. Another object of the invention is to provide a novel coincidence prism which also acts to divide the two bundles of rays received from the two ends of the instrument and to bring the portions from the two ends of the instruments into juxtaposition. Still another object of the invention is to provide a novel collimating system for stereoscopic telemeters.

To these and other ends, the invention consists of certain parts and combinations of parts all of which will be hereinafter described: the novel features being pointed out in the appended claims.

In the drawings:

Fig. 1 is a diagrammatic plan view of the optical part of the instrument;

Fig. 2 is a diagrammatic view of the optical parts in elevation;

Fig. 3 is a perspective view of the optical parts;

Figs. 4 and 5 are respectively rear and top views of the coincidence prism;

Fig. 6 is a fragmentary view of a mechanical structure in which my optical system may be arranged;

Fig. 7 is a diagrammatic view of the optical system showing prisms of the collimating means shifted to inoperative positions;

Fig. 8 shows a fragmentary underside view of the mounting of the pentaprism;

Fig. 9 illustrates the intermediate details of the small pentaprism shifting mechanism;

Fig. 10 illustrates positions of images as viewed in eye pieces;

Fig. 11 illustrates the images as viewed in the eye pieces of the targets during collimation;

Fig. 12 is a perspective view of one of the target illuminating prisms; and

Fig. 13 is a vertical section through the coincidence prism at the joining point of the two portions.

In the illustrated embodiment of the invention 1 and 2 indicate the objectives which, in this instance, are arranged with their optical axes in alignement. Associated with these two objectives 1 and 2 are two pentaprisms 3 and 4 respectively. These pentaprisms are arranged at opposite ends of the instrument and receive in their receiving faces 4ᵃ and 5 respectively two bundles of rays indicated by the rays 6 and 7 respectively. These rays 6 and 7 after passing through the pentaprisms 3 and 4 respectively pass to and through the objectives 1 and 2 without any cutting off of the bundles, the entire bundles of rays from both ends of the instrument passing through the two objectives.

From the two objectives, the two bundles pass to an optical means which divides each bundle of rays into two parts and directs the two halves to the occular rhomboid prisms 8 and 9 which present the rays to the eye pieces 10 and 11. This optical means, in this instance, is in the form of a single prism made preferably of two parts 12 and 13 having two plane faces cemented together at 14, one-half of each of said cemented faces of the two pieces being silvered at 15 before being cemented so that one half of each of the two faces acts as a reflector for one side of the prism system. The upper edge of the silvered or reflecting area forms the coincidence line and is the focal plane for the images coming from both ends of the instrument.

Starting with the bundle of rays 6 coming from the left hand side of the instrument these rays strike the roof shaped reflecting surface 16 which reverses the image with respect to right and left to bring it into proper relation with the image coming from the right hand end of the instrument. By this surface 16 the bundle is reflected 120°, the lower half striking the reflector 15 and the upper half passing through the upper area of the cemented surface so as to strike the surface 17 and reach the upper part of the right eye piece 11 of the instrument.

The other half of the image formed by the bundle of rays 6 strikes the mirrored surface 15 and is reflected by the roof shaped reflector 18 reversed as to right and left onto a reflecting surface 19 arranged at an angle to the rays and directing this half of the image to the ocular prisms 8 and to the upper part of the eye piece 10 where it is viewed in an upright position.

The bundle of rays 7 from the right hand side of the instrument strikes the reflecting surface 20 and is reflected by the latter 120° toward the focal plane where one-half strikes the mirrored surface 15 and is reflected by said surface to the angularly arranged reflector 17 which reflects it to an angularly arranged reflector 21 on the coincident prism. The latter reflects the bundle to the ocular prism 9 which conducts this half of the image to the upper half of the eye piece 11. The other half of the bundle reflected by the mirror or reflector 20 passes above the upper edge of the reflector 15 and strikes the roof prism 18 which reflects such half to the reflector 19 on the coincident prism. This reflector 19 directs the bundle thus received to the ocular prism 8 which in turn directs such bundle to the lower part of the left eye piece 10.

Associated with the telemeter is a collimating system which has a cross collimating action so that the accuracy of both sides of the instrument may be insured. This collimating system comprises two target illuminating prisms 22 and 23 respectively provided with illuminating devices 24 and 25 respectively one for each side of the instrument. The target illuminating prisms 24 and 25 have the targets or collimating marks 26 and 27 associated therewith and throw images of said targets to the objectives 28 and 29 which have associated therewith mirrors, in this instance, in the form of reflecting or mirrored surfaces 31 receiving the bundles of rays after they have passed through the objectives and redirecting them again through the objectives as parallel rays to two small pentaprisms 32 and 33 respectively adapted to be associated with the main pentaprisms 3 and 4 respectively. These pentaprisms 32 and 33 are adapted to occupy the positions shown in Fig. 1 for cooperating with the reflector objective 28 to test one side of the instrument; or the position shown in Fig. 3 for cooperation with the reflector objective 29 to test the other side of the instrument or to be shifted out of optical relation with the pentaprisms 3 and 4, as shown in Fig. 7 for finding the range or distance. The pentaprisms 32 and 33 are small with relation to the pentaprisms 3 and 4, being less than half in thickness than the pentaprisms 3 and 4. As a consequence, the pentaprism 32 may be situated below the optical axis of the pentaprism 3, whereas, the pentaprism 33 may be situated above the optical axis of the pentaprism 4. Both the pentaprisms 32 and 33 are situated between the two reflector objectives 28 and 29 so as to lie in the path of the parallel rays from the reflector objectives, but above the cone of rays passing from the target prisms 26 and 27, as illustrated in Fig. 2. In order to effect the collimation of the instrument the two rotary wedge shaped lenses 35 and 36 are first turned about a common axis in opposite directions until the infinity mark on the scale 53$^a$ is viewable in the optical system 53$^b$ of the range reading means. If the optical system is not in collimation the pentaprisms 32 and 33 are adjusted to the positions illustrated in Fig. 1 and the target prism 22 is illuminated, the bundle of rays from the target 26 will be thrown to the reflector objective 28 and the parallel rays from the reflector objective 28 will pass, some to the pentaprism 33 and others to the pentaprism 32. Those rays striking the pentaprism 33 will pass through the optical system of the range finder by way of the objective 2, while those rays striking the pentaprism 32 will pass through the optical system of the range finder by way of the objective 1. These two bundles of rays will then pass to and through the coincidence prism and will be divided, one half of each bundle passing to the two eye pieces so that in both eye pieces will be viewed portions of the target 26, as shown in Fig. 11 at 26$^a$. The target images are now brought into alinement by rotating the wedge shaped prism 37 which is rotatable about a fixed axis adjacent the objective 1. This prism effects a slight vertical adjustment between the two target images, but this may be corrected by shifting laterally the optical tube to be described.

The collimation of the other side is then effected by shifting the pentaprisms 32 and 33 to the position shown in Fig. 3 and illuminating the target prism 23. The image of the target 27 is then projected on the reflector objective 29 and this reflector throws images of the target to the two eye pieces in the same manner as described with reference to the other end of the instrument. The wedge shaped lenses 37 are also turned to correct the collimation of the instrument with reference to this side of the instrument.

The mounting of the optical parts of the instrument may be effected in any suitable manner. In the illustrated embodiment, there is employed an outside casing 38 which supports adjacent its center, the main optical parts preferably through an optical tube 39 laterally adjustable in the outside casing in any suitable manner. At the center of this tube the coincidence prism may suitably be secured so that it may optically connect with the eye pieces 10 and 11 supported by the housing 38 in any suitable manner. At one end of the optical tube 29, the objective 1 is supported in a longitudinally movable tube 40 which through an externally threaded sleeve 41 may be adjusted longitudinally to shift the objective 1 in the direction of its optical axis, a nut 42 being employed for holding this objective in its adjusted position. Mounted to turn in the sleeve 40 is a sleeve for mounting 43 which supports the rotary prism 37 and is turned through a worm 44 operable in any suitable manner from the outside of the casing 38, a nut 45 being employed for holding the mounting 43 in its adjusted position. The sleeve 40 carries a segmental dial 46 while a segmental dial 47 connects with a sleeve 43 both dials being exposed to a window 48 in the casing 38 for simultaneous reading as a single scale.

At the opposite end of the optical tube 39, the objective 2 is arranged in a longitudinally adjustable sleeve 49, this adjustment being effected through a ring or sleeve 50 which is held in its adjustable position by a locknut 51. The lens 35 is supported on a rotary sleeve or carrier 52 which has a gear 53, whereas, the lens 36 is supported on a rotary sleeve or carrier which has a gear 55 connected therewith. The gears 53 and 55 are rotated in opposite directions for the purpose of rotating the lenses 35 and 36 without moving them axially and this may be effected by a shaft 56 having a swivel connection 57 with the shaft of a pinion 58 meshing with the gear 53 and also with the pinion 59 which meshes with the gear 54. The shaft 56 may be supported in any suitable manner and operable from the outside of the casing 38. A scale ring 53ᵃ on the gear 53 may be employed for effecting the collimation of the instrument as before set forth or for reading the range.

Within the outside casing 38 and adjacent the optical tube, the target illuminating prisms 22 and 23 may be arranged in proximity to the illuminating devices 24 and 25, as shown in Fig. 6.

The extreme ends of the casings 38 are not shown and may be of any approved construction. The pentaprisms 3 and 4 may be arranged adjacent these ends in housings 60 and 61 respectively being supported therein by flanges 62 Fig. 8. The prisms 32 and 33 are pivotally supported at 63 and 64 respectively on two swinging carriers 65 and 66. These carriers are in turn pivoted respectively at 67 and 68 on the housings 60 and 61 respectively of the prisms 3 and 4. It will thus be seen that each pentaprism 32 and 33 is mounted to swing about two axes, one on the swinging carrier 55 or 56 and the other about the axis 67 or 68 of its swinging carrier. For moving the swinging carriers 65 and 66 in opposite directions about their axes 67 and 68, an operating shaft 69 may be employed which has a gear 70 meshing with the rack 71 on a longitudinally movable bar 72. This bar consists of segments which are connected by sleeves 72ᵃ locked to said segments by pins 72ᵇ in turn carries near opposite ends two racks 73 an 74, one situated in rear of the axis 67 of the carrier 65 and the other situated in front of the axis 68 of the carrier 66. The rack 73 cooperates with the gear teeth 75 on the shaft 67 while the rack 74 cooperates with gear teeth 76 on the shaft 68. It will thus be seen, that when the shaft 72 moves to the right (Fig. 9), the two arms 65 and 66 move toward each other to carry the pentaprisms 32 and 33 to operative position, whereas, when the shaft 72 moves to the left (Fig. 9), the arms 65 and 66 move away from each other and carry the pentaprisms 32 and 33 to inoperative positions, as shown in dotted lines in Fig. 9.

With the end in view of controlling the movement of the prisms 32 and 33 about their respective axes 64 and 63, an operator 77 may be provided which has a pinion 78 thereon meshing with the rack 79 on an operating rod 80 consisting of segments connected by sleeves 80ᵃ locked to said segments by pins 80ᵇ that is provided near its opposite ends with two racks 81 and 82. These racks mesh respectively with segmental gears 83 and 84 provided on two shiftable members 85 and 86 turning about the axes 67 and 68 respectively. The members 85 and 86 each have two convex curved surfaces 87 and 88 separated by a segmental rack 89. Each surface 87 is adapted to cooperate with a concave surface 90 on the mounting of the prism 32 or 33. Each surface 88 is adapted to cooperate with a concave surface 91 on the mounting of the prism 32 or 33, while each rack 39 is adapted to cooperate with a segmental rack 92 on the mounting of the prism 32 or 33. The surfaces 87 and 88 are concentric with the axis of turning of the carrier 65 or 66 so that when either of these surfaces are engaged by a concave surface 90 or 91 there is no movement produced in the pentaprism 32 or 33 about its axis upon relative movement between the member 85 or 86 and the housing of the prism 32 or 33, but when the segmental gears 89 and 92 engage upon such relative movement the prisms 32 or 33 swing on their axes 63 and 64.

The casing 38 of the instrument is provided with openings opposite the prisms 3 and 4 so that outside rays may reach the prisms 3 and 4 through said openings as is common in instruments of this type. To the end that these openings will become ineffective during the collimations of the instrument, shutters 93 are mounted on the carriers 65 and 66 in front of the prisms 32 and 33 and move with said prisms from operative to inoperative position, being so constructed that the prisms 32 and 33 may turn on the carriers without interfering with the shutters.

Assuming that the prisms 32 and 33 are lying in their dotted or inoperative positions shown in Fig. 9 and it is desired to move them to the full line positions shown in such figure, the operator 69 is turned to swing the carriers 65 and 66 to their extreme positions toward each other. During this movement, the surfaces 90 travel over the surfaces 87 so that there is no turning of the prisms 32 and 33 on the axes 63 and 64. Thereafter, the operator 77 is moved to cause the surfaces 87 to travel on the surfaces 90 and the gear 89 of the member 86 to mesh with the gear 92 of the mounting of the lens of the prism 33 so as to swing the prism 33 on its axis 34. While in the position illustrated in Fig. 9, the members 85 and 86 may be turned without shifting the carriers 65 and 66 to shift the positions of the prisms 32 and 33 in order to effect the collimation of the other side of the instrument.

The operation of this invention will be understood from the foregoing, but it may be summarized as follows: The collimation of the instrument having been effected as before pointed out, the object, the distance of which is to be ascertained is viewed through the eye pieces 10 and 11 in the lower half of which will be visible portions of the image received from the two objectives while in the upper half of the eye pieces will appear the portions of the two objective images, as shown in Fig. 10. The upper and lower portions are then brought into coincidence in those parts imaging the object whose distance is to be measured, by the turning of the lenses 35 and 36 reference to the scale 53ª showing the range of the object.

In this invention practially one hundred percent of the rays received by the objective are transmitted to the eye pieces. No portions of the rays are cut off as has been customary heretofore in coincidence telemeters. The full bundle of rays from each objective is divided into two parts and each part is transmitted to the two eye pieces, one part to one and the other part to the other. A novel collimating means is provided which makes it possible to readily correct either arm of the instrument or in other words to obtain a cross collimation in the instrument.

What I claim as my invention and desire to secure by Letters Patent is:

1. A stereoscopic telemeter comprising two objectives, two oculars, means dividing the entire bundle received from each objective into two bundles of rays, each of which transmits only a portion of the image received from an objective, and means for directing the entire two bundles of rays from each image to both of the oculars.

2. A stereoscopic telemeter comprising two objectives, two oculars each optically connected to one of the objectives, two reflectors each cutting off a portion of the bundles of rays from one of said objectives, and means optically connecting the reflectors with the ocular of the other objective to direct the entire bundle of rays received by it.

3. A stereoscopic telemeter comprising two objectives, two oculars each connected to one of the objectives, two oppositely disposed reflectors arranged at the focal plane of the instrument, each cutting off a portion of the bundle of rays from one objective, and means optically connecting the reflectors with the ocular of the other objective to direct the entire bundle of rays received by it.

4. A stereoscopic telemeter comprising two objectitves, two oculars, and a coincidence prism optically connected to both oculars and both objectives and having means for dividing the entire bundle of rays of the image from each objective into two halves and means for bringing the entire bundle of rays of each half of the image from one objective into juxtaposition to the entire bundle of rays of the opposite half of the image from the other objective.

5. In a telemeter of the type having two objectives, an ocular, and means optically connecting both objectives with the ocular including a coincidence prism distinguished by the provision of two movable reflectors at opposite ends of the instrument lying on opposite sides of the optical axis of the instrument, two collimating objectives situated at opposite ends of the instrument, and two reflectors each adapted to receive rays from one of the collimating objectives and redirecting them as parallel rays back through such collimating objective to the movable reflector and objective at the opposite end of the instrument, and means for effecting the movement of the movable reflectors to optically connect each with its adjacent objective and also simultaneously with either one of the collimating objectives so that a target presented to such collimating objective will have two images thereof viewable in the ocular in juxtaposition.

6. A telemeter of the type having two objectives, an ocular, means optically connecting the ocular with both objectives including a coincidence prism and two pentaprisms optically connected one with each objective, distinguished by two small adjuster pentaprisms optically connected with the two other pentaprisms and lying on opposite sides of the optical axes of said two pentaprisms, two reflecting objectives, said adjuster pentaprisms being movable to optically connect simultaneously with either one of the second mentioned reflector objectives so that a target presented to that reflector objective which is optically connected to the movable reflectors will have two images thereof viewable in the ocular in juxtaposition.

7. A telemeter of the type having two objectives, an ocular, means optically connecting both objectives with the ocular including a coincidence prism, and a range compensating prism associated with one of the objectives, distinguished by the provision of a common mounting for one of the objectives and the range compensating prism, and means for effecting the movement of the mounting in the direction of the optical axis of the objective to focus the objective and means for effecting the removal of the mounting from the telemeter as a unit.

JOSEPH MIHALYI.